(12) United States Patent
Brozek et al.

(10) Patent No.: US 12,355,229 B2
(45) Date of Patent: *Jul. 8, 2025

(54) RESETTABLE ELECTRONIC FUSE FOR HIGH-POWER DEVICES

(71) Applicant: MILWAUKEE ELECTRIC TOOL CORPORATION, Brookfield, WI (US)

(72) Inventors: Jeffrey M. Brozek, Mequon, WI (US); Benjamin Tesch, Milwaukee, WI (US); Chien-Chih Chao, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,039

(22) Filed: Apr. 22, 2024

(65) Prior Publication Data

US 2024/0275161 A1  Aug. 15, 2024

Related U.S. Application Data

(63) Continuation of application No. 17/051,504, filed as application No. PCT/US2020/042539 on Jul. 17, 2020, now Pat. No. 11,967,817.

(Continued)

(51) Int. Cl.
*H02H 3/087* (2006.01)
*H02H 3/06* (2006.01)
(Continued)

(52) U.S. Cl.
CPC .......... *H02H 3/087* (2013.01); *H02H 5/047* (2013.01); *H02H 7/18* (2013.01); *H02H 3/066* (2013.01)

(58) Field of Classification Search
CPC .......... H02H 3/087; H02H 5/047; H02H 7/18; H02H 3/066; H02H 3/10; H02H 3/20; H02H 5/04
(Continued)

(56) References Cited

U.S. PATENT DOCUMENTS 4,536,699 A * 8/1985 Baker ................. G05F 1/56
323/280
5,903,423 A    5/1999 Okano et al.
(Continued)

FOREIGN PATENT DOCUMENTS

CN  1297828 A  6/2001
CN  101361148 A  2/2009
(Continued)

OTHER PUBLICATIONS

International Search Report and Written Opinion for Application No. PCT/US2020/042539 dated Oct. 26, 2020 (11 pages).
(Continued)

*Primary Examiner* — Dharti H Patel
(74) *Attorney, Agent, or Firm* — Michael Best & Friedrich LLP

(57) ABSTRACT

A resettable electronic fuse for a high-power device such as a power tool, a battery pack for the power tool, or a battery pack charger. The resettable electronic fuse is connected in a current path of the device and is operable or configured to selectively interrupt current through the resettable electronic fuse based on a detected condition of the device (e.g., a detected fault condition of the device). The resettable electronic fuse is also configured to be reset after a detected fault condition has ended. In some embodiments, the resettable electronic fuse is configured to reset itself. In other embodiments, the resettable electronic fuse is configured to receive a signal (e.g., from a device controller) to reset.

20 Claims, 8 Drawing Sheets

Related U.S. Application Data

(60) Provisional application No. 62/876,099, filed on Jul. 19, 2019.

(51) Int. Cl.
*H02H 5/04* (2006.01)
*H02H 7/18* (2006.01)

(58) Field of Classification Search
USPC .................................................. 361/93.1
See application file for complete search history.

(56) References Cited

U.S. PATENT DOCUMENTS

| | | | |
|---|---|---|---|
| 6,288,881 B1 | 9/2001 | Melvin et al. | |
| 7,270,910 B2* | 9/2007 | Yahnker | H02J 7/00036 |
| | | | 429/61 |
| 7,492,125 B2 | 2/2009 | Serdynski et al. | |
| 7,508,171 B2* | 3/2009 | Carrier | H02J 7/00304 |
| | | | 320/135 |
| 7,602,146 B2* | 10/2009 | Carrier | H01M 10/486 |
| | | | 320/120 |
| 7,719,234 B2 | 5/2010 | Carrier et al. | |
| 7,728,553 B2* | 6/2010 | Carrier | H02J 7/00308 |
| | | | 320/124 |
| 7,928,692 B2 | 4/2011 | Carrier et al. | |
| 8,093,863 B2 | 1/2012 | Carrier et al. | |
| 8,129,955 B2* | 3/2012 | White | H01M 50/204 |
| | | | 320/150 |
| 8,210,273 B2* | 7/2012 | Suzuki | H01M 10/4207 |
| | | | 173/217 |
| 8,305,725 B2* | 11/2012 | Ooi | H02J 7/00304 |
| | | | 361/103 |
| 8,330,426 B2 | 12/2012 | Suzuki et al. | |
| 8,384,349 B2 | 2/2013 | Suzuki et al. | |
| 8,513,922 B2 | 8/2013 | Yang et al. | |
| 8,649,140 B2 | 2/2014 | Peterson et al. | |
| 8,698,457 B2 | 4/2014 | Hogari et al. | |
| 8,742,724 B2 | 6/2014 | Suzuki et al. | |
| 8,982,578 B2* | 3/2015 | Bryan | B60Q 11/005 |
| | | | 361/784 |
| 9,465,057 B2 | 10/2016 | Aerts | |
| 9,998,117 B2 | 6/2018 | Du et al. | |
| 10,211,488 B2 | 2/2019 | Willgert et al. | |
| 10,241,526 B2 | 3/2019 | Marschalkowski et al. | |
| 10,256,454 B2 | 4/2019 | Yang et al. | |
| 2003/0151868 A1* | 8/2003 | Inae | H01M 10/42 |
| | | | 361/88 |
| 2005/0073282 A1* | 4/2005 | Carrier | H01M 10/482 |
| | | | 320/106 |
| 2006/0112570 A1 | 6/2006 | Serdynski et al. | |
| 2006/0203400 A1* | 9/2006 | Bodano | H10D 84/619 |
| | | | 257/E23.044 |
| 2008/0003491 A1 | 1/2008 | Yahnker et al. | |
| 2008/0304199 A1 | 12/2008 | Cruise et al. | |
| 2009/0146614 A1* | 6/2009 | Carrier | H01M 50/583 |
| | | | 320/152 |
| 2011/0042117 A1 | 2/2011 | Doege et al. | |
| 2011/0253406 A1 | 10/2011 | Glauning | |
| 2012/0008448 A1 | 1/2012 | Kim et al. | |
| 2012/0200967 A1 | 8/2012 | Mikolajczak | |
| 2012/0224289 A1* | 9/2012 | Peterson | H02J 7/00309 |
| | | | 361/79 |
| 2013/0280578 A1 | 10/2013 | Yang et al. | |
| 2013/0321966 A1* | 12/2013 | Syngaevskiy | H02H 3/093 |
| | | | 361/87 |
| 2013/0344379 A1 | 12/2013 | Yang et al. | |
| 2014/0211345 A1* | 7/2014 | Thompson | H01H 9/548 |
| | | | 335/11 |
| 2015/0200537 A1* | 7/2015 | Kang | H02J 7/00302 |
| | | | 361/104 |
| 2016/0141594 A1* | 5/2016 | Hwang | H02H 7/18 |
| | | | 429/7 |
| 2017/0126973 A1* | 5/2017 | Skeoch | H02J 7/34 |
| 2018/0069394 A1 | 3/2018 | Hagen et al. | |

FOREIGN PATENT DOCUMENTS

| | | | | |
|---|---|---|---|---|
| CN | 101710742 A | 5/2010 | | |
| CN | 101944715 A | 1/2011 | | |
| CN | 106999184 A | 8/2017 | | |
| CN | 108292841 A | 7/2018 | | |
| CN | 109659895 A | 4/2019 | | |
| DE | 102012214881 A1 | 2/2014 | | |
| DE | 102013109348 A1 | 3/2015 | | |
| DE | 102014217991 A1 | 3/2016 | | |
| DE | 102015218259 A1 | 3/2017 | | |
| GB | 2566857 B | * | 8/2019 | A24F 40/95 |
| KR | 1020110056118 A | 5/2011 | | |
| KR | 1020150028069 A | 3/2015 | | |
| WO | WO-2016142628 A1 | * | 9/2016 | H02J 7/0068 |
| WO | WO-2019143411 A1 | * | 7/2019 | A61B 17/1628 |

OTHER PUBLICATIONS

Chinese Patent Office Action for Application No. 202080049921.0 dated May 25, 2023 (31 pages including machine English translation).
Extended European Search Report for Application No. 20843590.9 dated Jun. 29, 2023 (8 pages).
Chinese Patent Office Action for Application No. 202080049921.0 dated May 15, 2024 (31 pages including machine English translation).

* cited by examiner

RESETTABLE ELECTRONIC FUSE FOR HIGH-POWER DEVICES

RELATED APPLICATIONS

This application is a continuation of U.S. patent application Ser. No. 17/051,504, filed Oct. 29, 2020, which is a 35 U.S.C. § 371 national stage entry of PCT Patent Application No. PCT/US2020/042539, filed Jul. 17, 2020, which claims the benefit of U.S. Provisional Patent Application No. 62/876,099 filed on Jul. 19, 2019, the entire content of each of which is incorporated herein by reference.

BACKGROUND

Devices such as battery packs and battery pack chargers conventionally include a fuse in a charge or discharge current path to protect such devices from high or excessive currents. For example, a battery pack may include a fuse connected in series with one or more semiconductor switching devices (e.g., FETs). A high current could cause the fuse to be opened to protect the battery pack (e.g., the battery pack's cells) from the high current.

SUMMARY

Conventional fuses positioned in a charge or discharge path of a device for protecting the device from high or excessive currents have several drawbacks. The use of conventional fuses can render the device inoperable if the fuse were to be opened. For example, an opened fuse could render the device entirely inoperable or could at least require the device to be repaired and returned to working order. High-power application devices (e.g., devices outputting or receiving average currents of 20 amps or greater), such as power tools, battery packs for power tools, and battery pack chargers, frequently experience high currents that have the potential to open the fuse and render such devices inoperable. It would be advantageous in such high-power devices to remove and replace conventional fuses with a resettable electronic fuse. As a result, a fault or trip condition that causes the resettable electronic fuse to trip or open, does not permanently disable the device. Rather, the resettable electronic fuse or a controller connected to the resettable electronic fuse can be configured to reset the resettable electronic fuse to again make the device operable. Such a resettable electronic fuse can also be implemented in such a manner that it complies with the standards of one or more safety certification organizations, such as Underwriters Laboratories ("UL").

A resettable electronic fuse can be implemented in devices to replace, for example, the combination of a conventional fuse and a single semiconductor switch (e.g., a FET), the combination of a conventional fuse and dual semiconductor switches (e.g., FETs), etc. The resettable electronic fuse can provide devices with a net savings in space (e.g., by having a smaller circuit footprint), cost (e.g., by replacing multiple components with a single component), and heat generation. For example, a conventional fuse, in addition to any series-connected semiconductor switches, all generate heat when passing current. By removing the conventional fuse and replacing it with a resettable electronic fuse, there are fewer devices in a current path to generate heat. Reduced heat dissipation by a device can also reduce heat sinking requirements for the device, which can further provide cost and space savings.

Embodiments described herein provide a resettable electronic fuse for a device (e.g., a high-power device), such as a power tool, a battery pack for the power tool, or a battery pack charger. The resettable electronic fuse is connected in a current path of the device and is operable or configured to selectively interrupt current passing through the resettable electronic fuse based on a detected condition of the device (e.g., a detected fault condition of the device). The resettable electronic fuse is also configured to be reset after a detected fault condition has ended. In some embodiments, the resettable electronic fuse is configured to reset itself. In other embodiments, the resettable electronic fuse is configured to receive a signal (e.g., from a device controller) to reset.

Embodiments described herein provide a device including a path for passing electric current. The device also includes a terminal and a resettable electronic fuse. The resettable electronic fuse is in the path for passing electric current and is electrically connected to the terminal. The resettable electronic fuse includes a semiconductor switch including a conductive state and a nonconductive state, a driver circuit configured to control the semiconductor switch into either the conductive state or the nonconductive state, a sensing circuit configured to sense a parameter of the device, and a comparing circuit configured to compare the parameter of the device to a first reference value for the parameter of the device. The driver circuit is configured to control the semiconductor switch into the nonconductive state when the parameter of the device is greater than or equal to the first reference value for the parameter of the device.

Embodiments described herein provide a device including a path for passing electric current. The device incudes a terminal and a resettable electronic fuse. The resettable electronic fuse is electrically connected to the terminal. The resettable electronic fuse includes a first semiconductor switch including a conductive state and a nonconductive state, a second semiconductor switch including a conductive state and a nonconductive state, a driver circuit, a sensing circuit, and a comparing circuit. The driver circuit is configured to control the first semiconductor switch into either the conductive state or the nonconductive state and to control the second semiconductor switch into either the conductive state or the nonconductive state. The sensing circuit is configured to sense a parameter of the device. The comparing circuit is configured to compare the parameter of the device to a reference value for the parameter. The driver circuit is configured to control at least one of the first semiconductor switch and the second semiconductor switch into the nonconductive state when the parameter of the device is greater than or equal to the reference value for the parameter.

Embodiments described herein provide a device including a path for passing electric current from a power source. The device includes a terminal connected to the power source in the path for passing electric current and a resettable electronic fuse. The resettable electronic fuse includes a semiconductor switch connected to the terminal and including a conductive state and a nonconductive state, a driver circuit configured to control the semiconductor switch into either the conductive state or the nonconductive state, a sensing circuit configured to sense the electric current from the power source, and a comparing circuit configured to compare the electric current to a first reference value. The driver circuit is configured to control the semiconductor switch into the nonconductive state when the electric current is greater than or equal to the first reference value.

Embodiments described herein provide a method of operating a resettable electronic fuse. The resettable electronic fuse includes a semiconductor switch. The method includes monitoring a parameter of a device, determining whether the monitored parameter of the device is indicative of a fault condition of the device, generating an interrupt signal when the monitored parameter of the device is indicative of the fault condition of the device, controlling the semiconductor switch into a nonconductive state based on the interrupt signal, generating a reset signal after the semiconductor switch is controlled into the nonconductive state, and controlling the semiconductor switch into a conductive state based on the reset signal.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to one or more devices (e.g., high-power devices) that include a path for passing electric current. The devices include a resettable electronic fuse connected in the path for selectively controlling electric current on the path. For example, the one or more devices include a battery pack, a device such as a power tool, and a battery pack charger. The resettable electronic fuse includes one or more semiconductor switches, a driver circuit, a sensing or monitoring circuit, and a comparing circuit. The driver circuit is configured to selectively control a conductive state of the one or more semiconductor switches. The sensing or monitoring circuit is configured to sense or monitor a parameter of the device. The comparing circuit receives a signal from the sensing or monitoring circuit related to the parameter of the device and compares the signal to a reference signal. The comparing circuit generates an output signal for the driver circuit, and the drive circuit is configured to selectively control the conductive state of the one or more semiconductor switches based on the output signal from the comparing circuit. In some embodiments, the resettable electronic fuse is also configured to receive a signal from a controller of the device related to a second parameter of the device. The drive circuit is also configured to selectively control the conductive state of the one or more semiconductor switches based on the signal from the controller.

By controlling the conductive state of the one or more semiconductor switches, the driver circuit can trip or open the path for passing electric current to prevent current from passing. After the resettable electronic fuse has been tripped or opened, the resettable electronic fuse is also configured to be reset after, for example, a detected fault condition has ended. Although embodiments described herein can be applied to, performed by, or used in conjunction with a variety of high-power devices, embodiments described herein are described primarily with respect to a battery pack, a device such as a power tool, and a battery pack charger.

Figure 1:
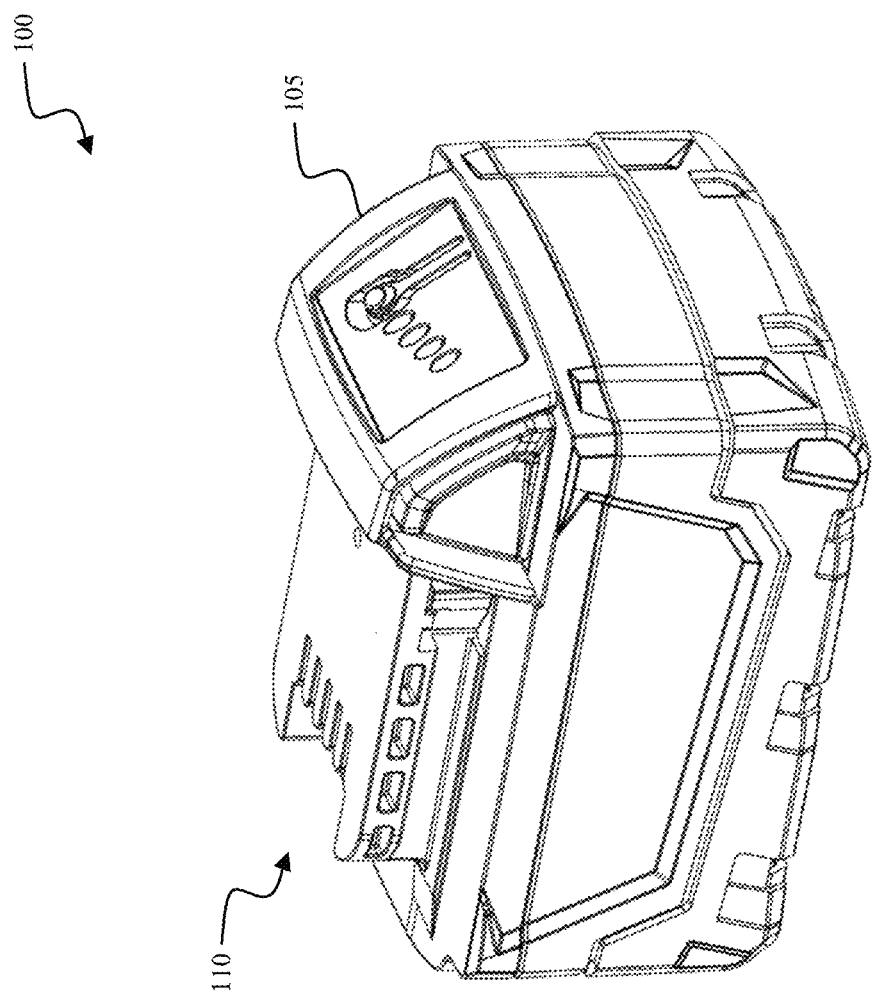
FIG. 1 illustrates a battery pack that includes a resettable electronic fuse, according to embodiments described herein.

FIG. 1 illustrates a battery pack 100 that includes a resettable electronic fuse or e-fuse. The battery pack 100 includes a housing 105 and an interface portion 110 for connecting the battery pack 100 to a device (e.g., a power tool). The resettable electronic fuse is configured to, for example, disable current into the battery pack 100 or out of the battery pack 100 by opening a current charge/discharge path of the battery pack 100. In some embodiments, the resettable electronic fuse is provided in a charge path or in a discharge path or in a path that both charges and discharges. The sizing and/or current thresholds of the resettable electronic fuse may vary depending on the particular path, such as smaller for a charge path and larger for a discharge path. In some embodiments, the resettable electronic fuse is a discrete component that includes one or more inputs and one or more outputs for passing current. For example, the resettable electronic fuse can be implemented as an integrated circuit including a casing or housing that encloses the resettable electronic fuse's circuitry. In other embodiments, the resettable electronic fuse does not include a casing or a housing and the resettable electronic fuse's circuitry is generally exposed. In some embodiments, the resettable electronic fuse is connected to a printed circuit board ("PCB") as a singular unit. In other embodiments, a plurality of discrete components are individually connected to a PCB and connected such that the plurality of discrete components collectively form a resettable electronic fuse. In some embodiments, the battery pack 100 includes a plurality of resettable electronic fuses.

The resettable electronic fuse is independently resettable (i.e., the electronic fuse is operable to or capable of resetting itself) and/or the resettable electronic fuse can be reset by a separate, external component (e.g., a battery pack controller, a power tool, a battery pack charger, etc.). For example, the resettable electronic fuse can be electrically and/or communicatively connected to a controller of the battery pack 100 such that the resettable electronic fuse provides signals to the controller or receives signals from the controller. The controller of the battery pack 100 is configured to receive, for example, a signal from the resettable electronic fuse indicating that the resettable electronic fuse has tripped. The controller of the battery pack 100 is also configured to generate and transmit a signal to the resettable electronic fuse to reset the electronic fuse. In some embodiments, the controller of the battery pack 100 is also configured to generate and transmit a signal to the resettable electronic fuse to provide an alternative signal to trip or open the resettable electronic fuse. For example, the controller of the battery pack 100 can sense or monitor a parameter of the battery pack 100 (e.g., battery cell voltage, temperature, etc.) for a fault condition and, based on the sensed or monitored parameter, provide the alternative signal to the resettable electronic fuse that causes the resettable electronic fuse to trip or open. In some embodiments, the controller trips if either the resettable electronic fuse identifies a trip condition or the alternative trip signal is received. In some embodiments, the resettable electronic fuse is reset only when both controller of the battery pack 100 and the resettable electronic fuse determine that a fault condition is cleared (e.g., switches can again be closed).

Figure 2:
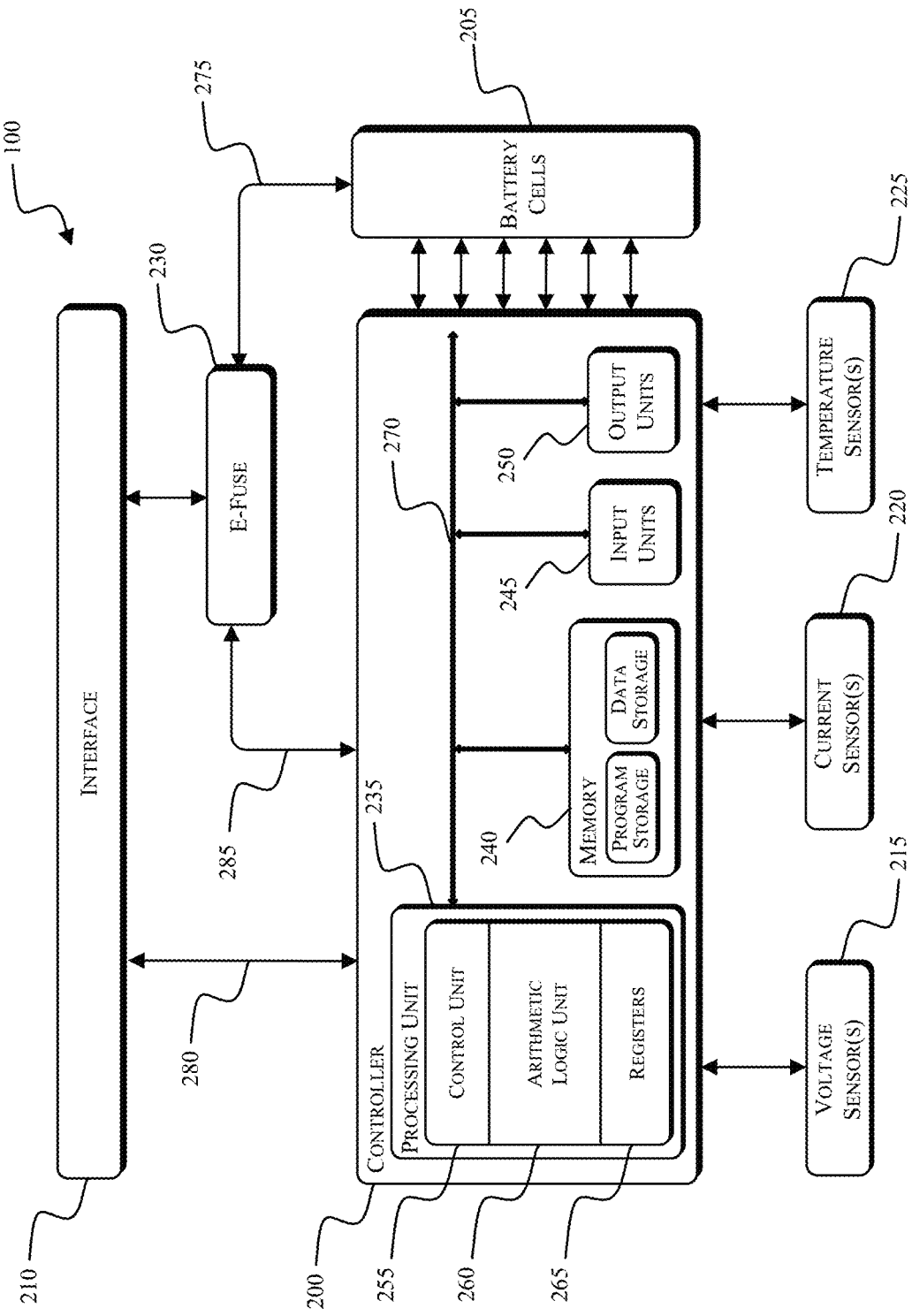
FIG. 2 illustrates a control system for the battery pack of FIG. 1, according to embodiments described herein.

FIG. 2 illustrates a control system for the battery pack 100. The control system includes a controller 200. The controller 200 is electrically and/or communicatively connected to a variety of modules or components of the battery pack 100. For example, the illustrated controller 200 is connected to one or more battery cells 205 and an interface 210 (e.g., the interface portion 110 of the battery pack 100 illustrated in FIG. 1). The controller 200 is also connected to one or more voltage sensors or voltage sensing circuits 215, one or more current sensors or current sensing circuits 220, and one or more temperature sensors or temperature sensing circuits 225. A resettable electronic fuse 230 is connected between the one or more battery cells 205 and the interface 210. The controller 200 includes combinations of hardware and software that are operable to, among other things, control the operation of the battery pack 100, control the operation of the resettable electronic fuse 230, monitor a condition of the battery pack 100, enable or disable charging of the battery pack 100, enable or disable discharging of the battery pack 100, etc.

The controller 200 includes a plurality of electrical and electronic components that provide power, operational control, and protection to the components and modules within the controller 200 and/or the battery pack 100. For example, the controller 200 includes, among other things, a processing unit 235 (e.g., a microprocessor, a microcontroller, or another suitable programmable device), a memory 240, input units 245, and output units 250. The processing unit 235 includes, among other things, a control unit 255, an arithmetic logic unit ("ALU") 260, and a plurality of registers 265 (shown as a group of registers in FIG. 2), and is implemented using a known computer architecture (e.g., a modified Harvard architecture, a von Neumann architecture, etc.). The processing unit 235, the memory 240, the input units 245, and the output units 250, as well as the various modules or circuits connected to the controller 200 are connected by one or more control and/or data buses (e.g., common bus 270). The control and/or data buses are shown generally in FIG. 2 for illustrative purposes. The use of one or more control and/or data buses for the interconnection between and communication among the various modules, circuits, and components would be known to a person skilled in the art in view of the invention described herein.

The memory 240 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 235 is connected to the memory 240 and executes software instructions that are capable of being stored in a RAM of the memory 240 (e.g., during execution), a ROM of the memory 240 (e.g., on a generally permanent basis), or another non-transitory computer readable medium such as another memory or a disc. Software included in the implementation of the battery pack 100 can be stored in the memory 240 of the controller 200. The software includes, for example, firmware, one or more applications, program data, filters, rules, one or more program modules, and other executable instructions. The controller 200 is configured to retrieve from the memory 240 and execute, among other things, instructions related to the control processes and methods described herein. In other constructions, the controller 200 includes additional, fewer, or different components.

The interface 210 includes a combination of mechanical components (e.g., rails, grooves, latches, etc.) and electrical components (e.g., one or more terminals) configured to and operable for interfacing (e.g., mechanically, electrically, and communicatively connecting) the battery pack 100 with another device (e.g., a power tool, a battery pack charger, etc.). For example, the interface 210 is configured to receive power through the resettable electronic fuse 230 via a power line 275 between the one or more battery cells 205 and the interface 210. The interface 210 is also configured to communicatively connect to the controller 200 via a communications line 280. In some embodiments, the controller 200 is also electrically and/or communicatively connected to the resettable electronic fuse 230 via a signal line 285.

The controller 200 is configured to determine whether a fault condition of the battery pack 100 is present and generate one or more control signals related to the fault condition. For example, the controller 200 is configured to detect an overvoltage condition of the one or more battery cells 205, and under voltage condition of the one or more battery cells 205, an over current condition (e.g., during charging or discharging), or an over temperature condition (e.g., during charging or discharging). In some embodiments, the over current condition corresponds to a particular current that is sensed for a particular amount of time. In some embodiments, an over current condition is detected when a current of between approximately 3 Amperes and 20 Amperes is detected for a predetermined amount of time (e.g., between 100 nano-seconds and 50 milli-seconds, or between 100 milli-seconds and 2 seconds). The amount of time and the detected current can be varied for different applications. In some embodiments, a current of between 3 Amperes and 20 A Amperes can be detected for up to 50 milli-seconds before a fault condition occurs. In other embodiments, a current of between 3 Amperes and 20 A Amperes can be detected for between 50 milli-seconds and several minutes (e.g., between 1 minute and 20 minutes) before a fault condition occurs. In some embodiments, a current of greater than 20 Amperes can be detected for between 50 milli-seconds and several minutes (e.g., between 1 minute and 20 minutes) before a fault condition occurs. In some embodiments, a current of approximately 30 Amperes can be detected for approximately 50 milli-seconds before a fault condition occurs. In some embodiments, a current of approximately 70 Amperes can be detected for approximately 100 nano-seconds before a fault condition occurs. In some embodiments, the current and trip times depend on the path in which the resettable electronic fuse is placed. For example, in a charging path, a trip current of approximately 3 Amperes to 20 Amperes can be detected for approximately 100 milli-seconds up to 2 seconds before a fault occurs. In a discharging path, a trip current of approximately 20 Amperes to 150 Amperes can be detected for approximately 500 milli-seconds up to 2 seconds before a fault occurs.

In some embodiments, the current threshold, the time threshold, or both the current threshold and the trip threshold are adjusted based upon which device is connected to the device with the resettable electronic fuse. For example, if the resettable electronic fuse is in a charger, the charger could raise or lower the trip threshold depending on the charging capability of the battery pack connected to it.

If the controller 200 detects one or more fault conditions of the battery pack 100 or determines that a fault condition of the battery pack no longer exists, the controller 200 is configured to provide information and/or control signals to another component of the battery pack 100 (e.g. the interface 210, the resettable electronic fuse 230, etc.). The signals can be configured to, for example, trip or open the resettable electronic fuse 230, reset the resettable electronic fuse 230, etc. In some embodiments, the resettable electronic fuse 230 is configured to independently sense or monitor a parameter of the battery pack 100 and independently trip or open based on the sensed or monitored parameter.

Figure 3:
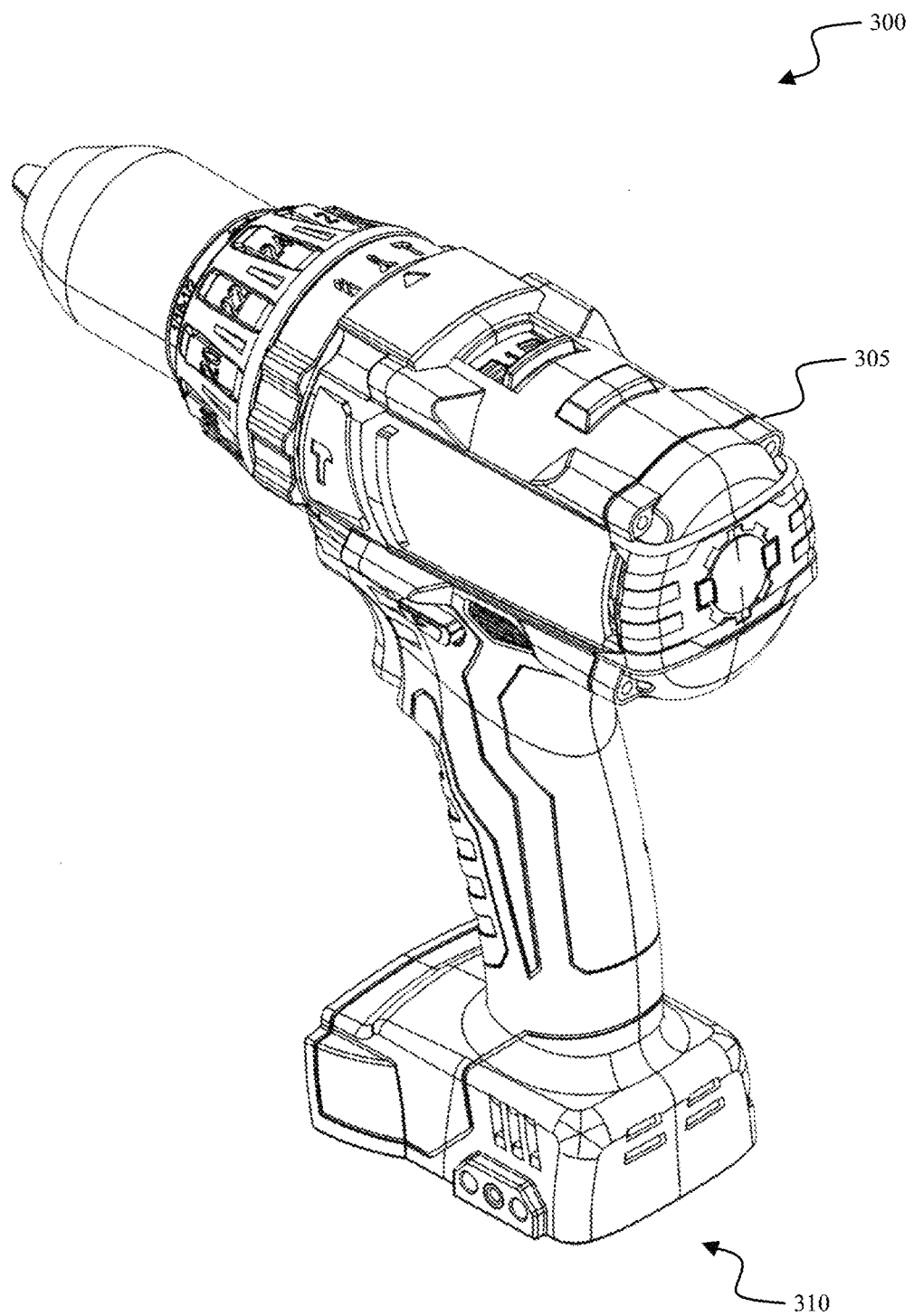
FIG. 3 illustrates a device that includes a resettable electronic fuse, according to embodiments described herein.

FIG. 3 illustrates a device 300 that includes a resettable electronic fuse or e-fuse. In the embodiment illustrated in FIG. 3, the device is a power tool (e.g., a drill/driver). In other embodiments, the device 300 is a different type of power tool (e.g., an impact wrench, a ratchet, a saw, a hammer drill, an impact driver, a rotary hammer, a grinder, a blower, a trimmer, etc.) or a different type of device (e.g., a light, a non-motorized sensing tool, etc.). The device 300 includes a housing 305 and an interface portion 310 for connecting the device 300 to, for example, the battery pack 100 or another device. The resettable electronic fuse is configured to, for example, disable current into the device 300 by opening a current path of the device 300. As described above with respect to the battery pack 100, in some embodiments, the resettable electronic fuse is a discrete component that includes a casing or housing and one or more inputs and one or more outputs for passing current. In other embodiments, the resettable electronic fuse does not include a casing or a housing and the resettable electronic fuse's circuitry is generally exposed. In some embodiments, the resettable electronic fuse is connected to a PCB as a singular unit. In other embodiments, a plurality of discrete components are individually connected to a PCB and connected such that the plurality of discrete components collectively form a resettable electronic fuse. In some embodiments, the device 300 includes a plurality of resettable electronic fuses.

The resettable electronic fuse is independently resettable (i.e., the electronic fuse is operable to or capable of resetting itself) and/or the resettable electronic fuse can be reset by a separate, external component (e.g., a device controller, a battery pack, a battery pack charger, etc.). For example, the resettable electronic fuse can be electrically and/or communicatively connected to a controller of the device 300 such that the resettable electronic fuse provides signals to the controller or receives signals from the controller. The controller of the device 300 is configured to receive, for example, a signal from the resettable electronic fuse indicating that the resettable electronic fuse has tripped. The controller of the device 300 is also configured to generate and transmit a signal to the resettable electronic fuse to reset the electronic fuse. In some embodiments, the controller of the device 300 is also configured to generate and transmit a signal to the resettable electronic fuse to trip or open the resettable electronic fuse. For example, the controller of the device 300 can sense or monitor a parameter of the device 300 (e.g., input current, temperature, etc.) for a fault condition and, based on the sensed or monitored parameter, provide a signal to the resettable electronic fuse that causes the resettable electronic fuse to trip or open.

Figure 4:
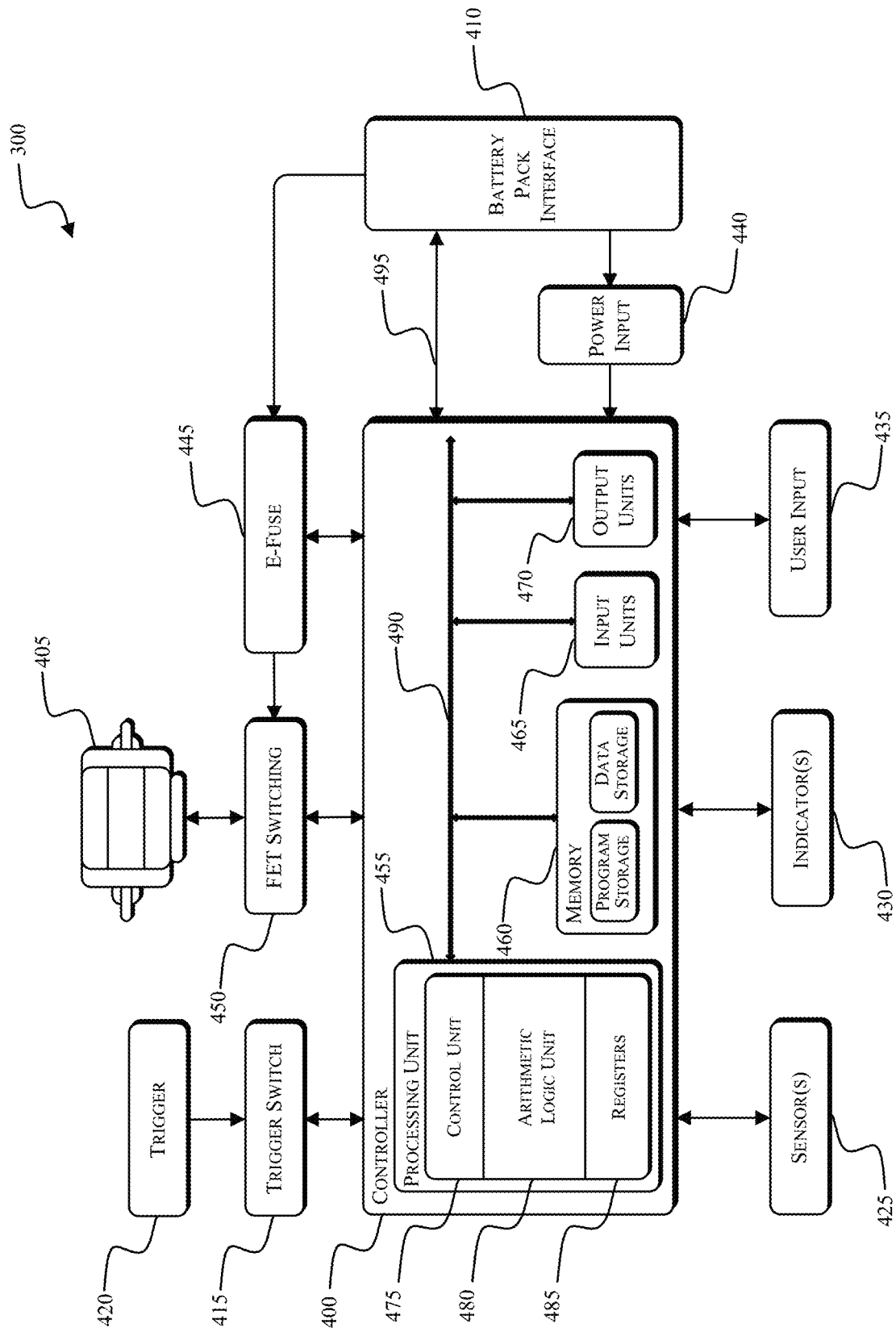
FIG. 4 illustrates a control system for the device of FIG. 3, according to embodiments described herein.

FIG. 4 illustrates a control system for the device 300. The control system includes a controller 400. The controller 400 is electrically and/or communicatively connected to a variety of modules or components of the device 300. For example, the illustrated controller 400 is electrically connected to a motor 405, a battery pack interface 410, a trigger switch 415 (connected to a trigger 420), one or more sensors or sensing circuits 425, one or more indicators 430, a user input module 435, a power input module 440, a resettable electronic fuse 445, and a FET switching module 450 (e.g., including a single stitching FET for a brushed motor or a plurality of switching FETs for a brushless motor). The controller 400 includes combinations of hardware and software that are operable to, among other things, control the operation of the device 300, monitor the operation of the device 300, activate the one or more indicators 430 (e.g., an LED), etc. The resettable electronic fuse 445 is connected between the battery pack interface 410 and the FET switching module 450.

The controller 400 includes a plurality of electrical and electronic components that provide power, operational control, and protection to the components and modules within the controller 400 and/or the device 300. For example, the controller 400 includes, among other things, a processing unit 455 (e.g., a microprocessor, a microcontroller, or another suitable programmable device), a memory 460, input units 465, and output units 470. The processing unit 455 includes, among other things, a control unit 475, an ALU 480, and a plurality of registers 485 (shown as a group of registers in FIG. 4), and is implemented using a known computer architecture (e.g., a modified Harvard architecture, a von Neumann architecture, etc.). The processing unit 455, the memory 460, the input units 465, and the output units 470, as well as the various modules or circuits connected to the controller 400 are connected by one or more control and/or data buses (e.g., common bus 490). The control and/or data buses are shown generally in FIG. 4 for illustrative purposes. The use of one or more control and/or data buses for the interconnection between and communication among the various modules, circuits, and components would be known to a person skilled in the art in view of the invention described herein.

The memory 460 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 455 is connected to the memory 460 and executes software instructions that are capable of being stored in a RAM of the memory 460 (e.g., during execution), a ROM of the memory 460 (e.g., on a generally permanent basis), or another non-transitory computer readable medium such as another memory or a disc. Software included in the implementation of the device 300 can be stored in the memory 460 of the controller 400. The software includes, for example, firmware, one or more applications, program data, filters, rules, one or more program modules, and other executable instructions. The controller 400 is configured to retrieve from the memory 460 and execute, among other things, instructions related to the control processes and methods described herein. In other constructions, the controller 400 includes additional, fewer, or different components.

The battery pack interface 410 includes a combination of mechanical components (e.g., rails, grooves, latches, etc.) and electrical components (e.g., one or more terminals) configured to and operable for interfacing (e.g., mechanically, electrically, and communicatively connecting) the device 300 with a battery pack (e.g., the battery pack 100). For example, power provided by the battery pack 100 to the device 300 is provided through the battery pack interface 410 to the power input module 440. The power input module 440 includes combinations of active and passive components to regulate or control the power received from the battery pack 100 prior to power being provided to the controller 400. The battery pack interface 410 also supplies power to the FET switching module 450 through the resettable electronic fuse 445 to be switched by the switching FETs to selectively provide power to the motor 405. The battery pack interface 410 also includes, for example, a communication line 495 for provided a communication line or link between the controller 400 and the battery pack 100. In some embodiments, the controller 400 is also electrically and/or communicatively connected to the resettable electronic fuse 445 via a signal line.

The indicators 430 include, for example, one or more light-emitting diodes ("LEDs"). The indicators 430 can be configured to display conditions of, or information associated with, the device 300. For example, the indicators 430 are configured to indicate measured electrical characteristics of the device 300, the status of the device, the status of the resettable electronic fuse 445, etc. The user input module 435 is operably coupled to the controller 400 to, for example, select a forward mode of operation or a reverse mode of operation, a torque and/or speed setting for the device 300 (e.g., using torque and/or speed switches), etc. In some embodiments, the user input module 435 includes a combination of digital and analog input or output devices required to achieve a desired level of operation for the device 300, such as one or more knobs, one or more dials, one or more switches, one or more buttons, etc.

The controller 400 is configured to determine whether a fault condition of the device 300 is present and generate one or more control signals related to the fault condition. For example, the sensors 425 include one or more current sensors, one or more speed sensors, one or more Hall Effect sensors, one or more temperature sensors, etc. The controller 400 calculates or includes, within memory 460, predetermined operational threshold values and limits for operation of the device 300. For example, when a potential thermal failure (e.g., of a FET, the motor 405, etc.) is detected or predicted by the controller 400, power to the motor 405 can be limited or interrupted until the potential for thermal failure is reduced. If the controller 400 detects one or more such fault conditions of the device 300 or determines that a fault condition of the device 300 no longer exists, the controller 400 is configured to provide information and/or control signals to another component of the battery pack 100 (e.g. the battery pack interface 410, the indicators 430, the resettable electronic fuse 445, etc.). The signals can be configured to, for example, trip or open the resettable electronic fuse 445, reset the resettable electronic fuse 445, etc. In some embodiments, the resettable electronic fuse 445 is configured to independently sense or monitor a parameter of the device 300 and independently trip or open based on the sensed or monitored parameter.

Figure 5:
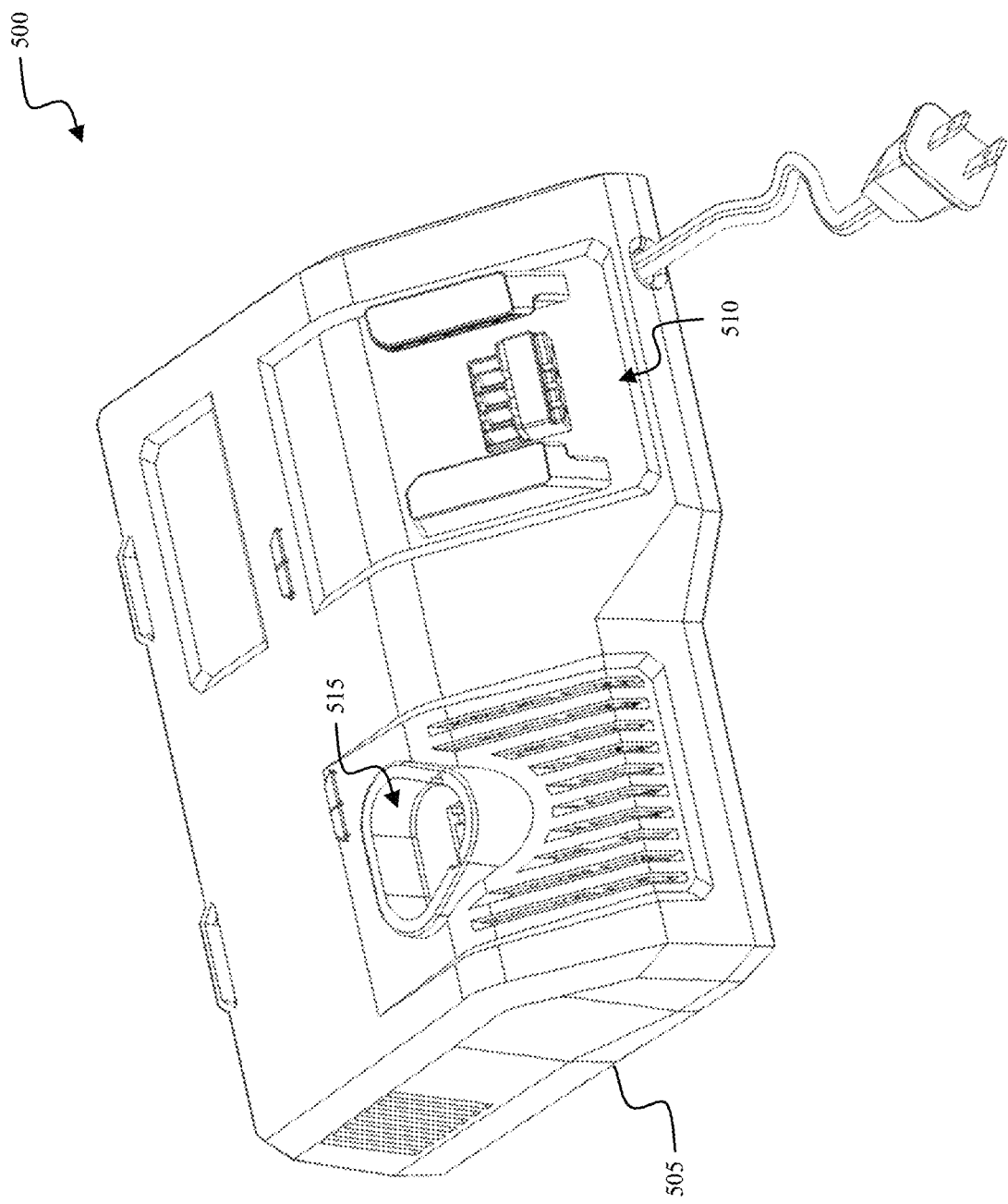
FIG. 5 illustrates a battery pack charger that includes a resettable electronic fuse, according to embodiments described herein.

FIG. 5 illustrates a battery pack charger 500 that includes a resettable electronic fuse or e-fuse. The battery pack charger 500 includes a housing 505 and interface portions 510, 515 for connecting the battery pack charger 500 to one or more battery packs (e.g., battery pack 100). The resettable electronic fuse is configured to, for example, disable current out of the battery pack charger 500 by opening a current path of the battery pack charger 500. As described above with respect to the battery pack 100, in some embodiments, the resettable electronic fuse is a discrete component that includes a casing or housing and one or more inputs and one or more outputs for passing current. In other embodiments, the resettable electronic fuse does not include a casing or a housing and the resettable electronic fuse's circuitry is generally exposed. In some embodiments, the resettable electronic fuse is connected to a PCB as a singular unit. In other embodiments, a plurality of discrete components are individually connected to a PCB and connected such that the plurality of discrete components collectively form a resettable electronic fuse. In some embodiments, the battery charger 500 includes a plurality of resettable electronic fuses.

The resettable electronic fuse is independently resettable (i.e., the electronic fuse is operable to or capable of resetting itself) and/or the resettable electronic fuse can be reset by a separate, external component (e.g., a battery pack charger controller, a power tool, a battery pack, etc.). For example, the resettable electronic fuse can be electrically and/or communicatively connected to a controller of the battery pack charger 500 such that the resettable electronic fuse provides signals to the controller or receives signals from the controller. The controller of the battery pack charger 500 is configured to receive, for example, a signal from the resettable electronic fuse indicating that the resettable electronic fuse has tripped. The controller of the battery pack charger 500 is also configured to generate and transmit a signal to the resettable electronic fuse to reset the electronic fuse. In some embodiments, the controller of the battery pack charger 500 is also configured to generate and transmit a signal to the resettable electronic fuse to trip or open the resettable electronic fuse. For example, the controller of the battery pack charger 500 can sense or monitor a parameter of the battery pack charger 500 (e.g., output current, temperature, etc.) for a fault condition and, based on the sensed or monitored parameter, provide a signal to the resettable electronic fuse that causes the resettable electronic fuse to trip or open.

Figure 6:
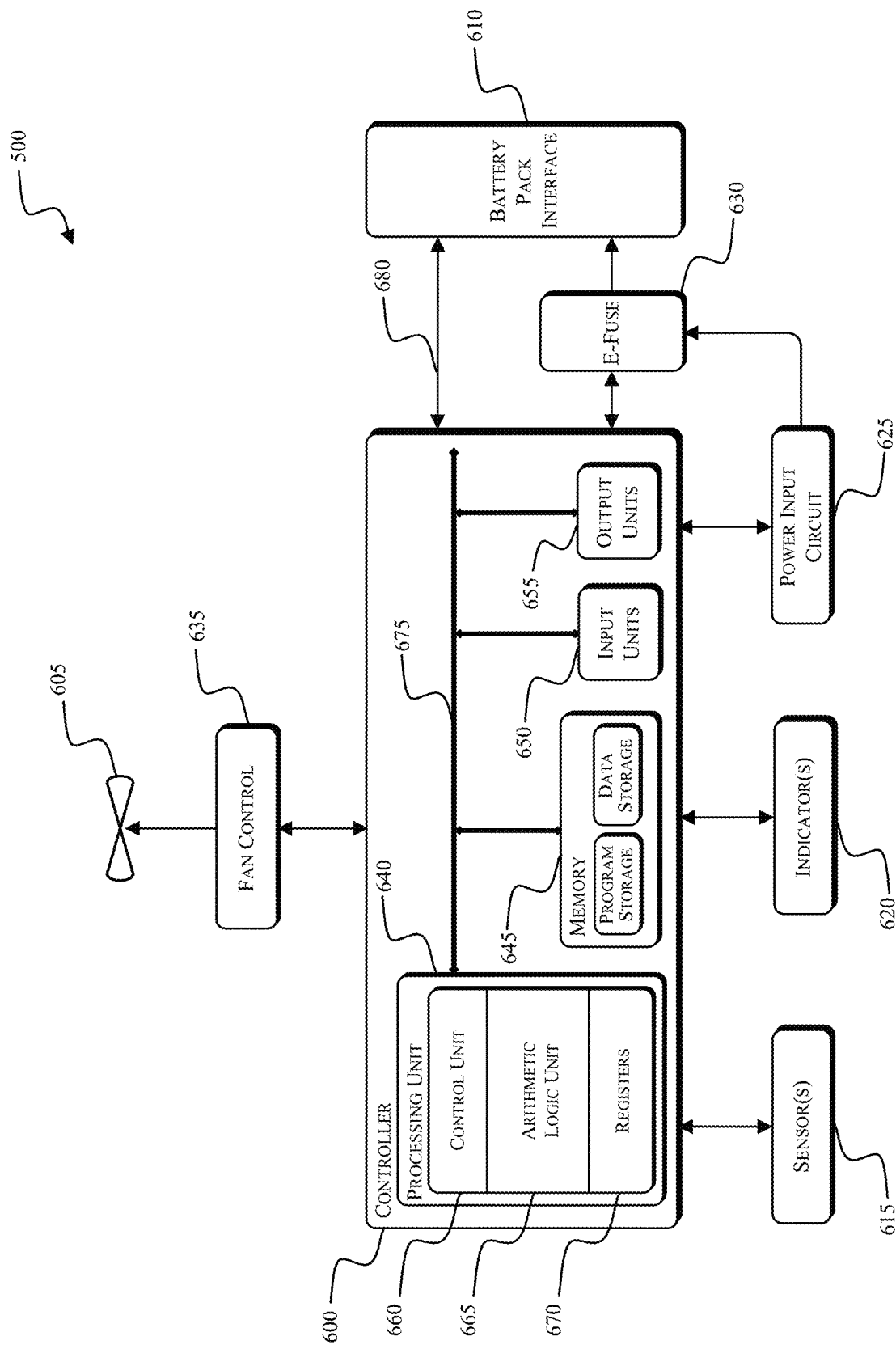
FIG. 6 illustrates a control system for the device of FIG. 5, according to embodiments described herein.

FIG. 6 illustrates a control system for the battery pack charger 500. The control system includes a controller 600. The controller 600 is electrically and/or communicatively connected to a variety of modules or components of the battery pack charger 500. For example, the illustrated controller 600 is electrically connected to a fan 605, a battery pack interface 610 (e.g., interface portions 515, 520), one or more sensors or sensing circuits 615 (e.g., current sensors, temperature sensors, etc.), one or more indicators 620, a power input circuit 625, and a fan control module or circuit 635. The controller 600 includes combinations of hardware and software that are operable to, among other things, control the operation of the battery pack charger 500, determine a temperature of a heatsink, activate the indicators 620 (e.g., one or more LEDs), etc.

The controller 600 includes a plurality of electrical and electronic components that provide power, operational control, and protection to the components and modules within the controller 600 and/or battery pack charger 500. For example, the controller 600 includes, among other things, a processing unit 640 (e.g., a microprocessor, a microcontroller, or another suitable programmable device), a memory 645, input units 650, and output units 655. The processing unit 640 includes, among other things, a control unit 660, an ALU 665, and a plurality of registers 670 (shown as a group of registers in FIG. 6), and is implemented using a known computer architecture (e.g., a modified Harvard architecture, a von Neumann architecture, etc.). The processing unit 640, the memory 645, the input units 650, and the output units 655, as well as the various modules or circuits connected to the controller 600 are connected by one or more control and/or data buses (e.g., common bus 675). The control and/or data buses are shown generally in FIG. 6 for illustrative purposes. The use of one or more control and/or data buses for the interconnection between and communication among the various modules, circuits, and components would be known to a person skilled in the art in view of the invention described herein.

The memory 645 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 640 is connected to the memory 645 and executes software instructions that are capable of being stored in a RAM of the memory 645 (e.g., during execution), a ROM of the memory 645 (e.g., on a generally permanent basis), or another non-transitory computer readable medium such as another memory or a disc. Software included in the implementation of the battery pack charger 500 can be stored in the memory 645 of the controller 600. The software includes, for example, firmware, one or more applications, program data, filters, rules, one or more program modules, and other executable instructions. The controller 600 is configured to retrieve from the memory 645 and execute, among other things, instructions related to the control processes and methods described herein. In other constructions, the controller 600 includes additional, fewer, or different components.

The battery pack interface 610 includes a combination of mechanical components (e.g., rails, grooves, latches, etc.) and electrical components (e.g., one or more terminals) configured to and operable for interfacing (e.g., mechanically, electrically, and communicatively connecting) the battery pack charger 500 with a battery pack (e.g., battery pack 100). For example, the battery pack interface 610 is configured to receive power through the resettable electronic fuse 630 via a power line between the power input circuit 625 and the battery pack interface 610. The battery pack interface 610 is also configured to communicatively connect to the controller 600 via a communications line 680. In some embodiments, the controller 600 is also electrically and/or communicatively connected to the resettable electronic fuse 630 via a signal line.

The controller 600 is configured to determine whether a fault condition of the battery pack charger 500 is present and generate one or more control signals related to the fault condition. For example, the sensors 615 include one or more current sensors, one or more temperature sensors, etc. The controller 600 is configured to detect an over current condition (e.g., when charging the battery pack 100), an over temperature condition, etc. If the controller 600 detects one or more fault conditions of the battery pack charger 500 or determines that a fault condition of the battery pack charger no longer exists, the controller 600 is configured to provide information and/or control signals to another component of the battery pack charger 500 (e.g., the battery pack interface 610, the resettable electronic fuse 630, etc.). The signals can be configured to, for example, trip or open the resettable electronic fuse 630, reset the resettable electronic fuse 630, etc. In some embodiments, the resettable electronic fuse 630 is configured to independently sense or monitor a parameter of the battery pack charger 500 and independently trip or open based on the sensed or monitored parameter.

Figure 7:
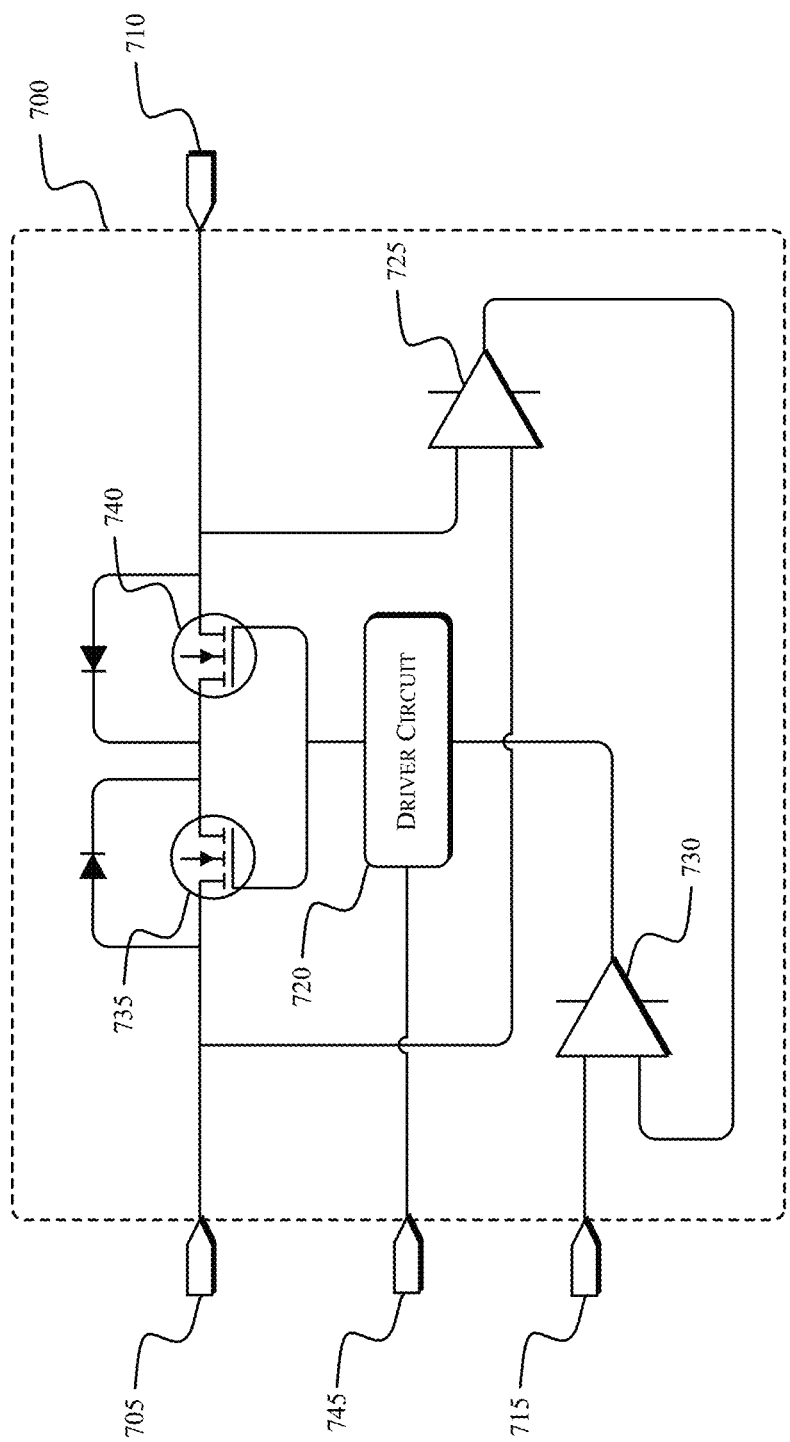
FIG. 7 illustrates a resettable electronic fuse, according to embodiments described herein.

FIG. 7 illustrates a resettable electronic fuse or e-fuse, such as the resettable electronic fuse 230, 445, or 630 described above with respect to FIGS. 2, 4, and 6, respectively. The resettable electronic fuse 230, 445, 630 includes a casing or housing 700. In the illustrated embodiment of the resettable electronic fuse 230, 445, 630, the resettable electronic fuse 230, 445, 630 is a discrete component that includes a first input/output pin 705, a second input/output pin 710, and a third input/output pin 715. In some embodiments, the first input/output pin 705 and the second input/output pin 710 are configured to pass current unidirectionally or bidirectionally depending upon the application in which the resettable electronic fuse 230, 445, 630 is implemented. For example, the resettable electronic fuse 230 implemented in the battery pack 100 is configured to pass current bidirectionally (i.e., during charging and discharging) to provide protection to the battery pack 100 when current is received by the battery pack 100 or discharged from the battery pack 100. In other embodiments, the resettable electronic fuse 230 is configured to pass current unidirectionally in a charging current path or a discharging current path. In some embodiments, the third input/output pin 715 is configured to provide a reference signal to the resettable electronic fuse 230, 445, 630. For example, the third input/output pin 715 can be configured to provide a reference signal related to an overcurrent condition of the battery pack 100 that causes the resettable electronic fuse 230 to trip or open to stop or interrupt electric current passing through the resettable electronic fuse 230.

Although the resettable electronic fuse 230, 445, 630 is illustrated in FIG. 7 as including a casing or housing 700 (e.g., as an integrated circuit with enclosed circuitry), in other embodiments, the resettable electronic fuse 230, 445, 630 does not include the casing or a housing 700. In such embodiments, the resettable electronic fuse 230, 445, 630's circuitry is generally exposed. The circuitry associated with the resettable electronic fuse 230, 445, 630 includes a driver module or driver circuit 720 (e.g., a bootstrap circuit, a charge pump circuit, etc.), a sensing circuit 725 (e.g., an operational amplifier configured as a current sensor, a current mirror, etc.), a comparing circuit 730 (e.g., an operational amplifier configured as a comparator), a first semiconductor switch 735 (e.g., an N- or P-channel MOSFET), and a second semiconductor switch 740 (e.g., an N- or P-channel MOSFET). In some embodiments, the resettable electronic fuse 230, 445, 630 includes only a single semiconductor switch. The first semiconductor switch 735 and second semiconductor switch 740 each include a first state in which current is able to pass through the switch (e.g., an ON state, a conductive state, etc.) and a second state in which current is not able to pass through the switch (e.g., an OFF state, a non-conductive state, etc.).

The resettable electronic fuse 230, 445, 630 is configured to monitor for and identify a fault condition. For example, the sensing circuit 725 can be configured to sense a current passing through the first semiconductor switch 735 and/or the second semiconductor switch 740. An output signal from the sensing circuit 725 is provided as an input to the comparing circuit 730. The comparing circuit 730 also receives a reference signal from the third input/output pin 715. The reference signal corresponds, for example, to a reference current or current limit value (e.g., a overcharge current signal, an overdischarge current signal, etc.). In some embodiments, the reference signal is a fixed reference signal set using a combination of electrical and electronic components (e.g., a resistor divider circuit). In other embodiments, the reference signal is provided from a controller (e.g., controller 200, 400, 600) and can be modified or adjusted based on one or more conditions. For example, the controller 200, 400, 600 can include a plurality of reference signal values stored in memory 240, 460, 645, respectively, and the controller 200, 400, 600 is configured to output a determined or selected reference signal based on an operational condition of the battery pack 100, the device 300, or the battery pack charger 500. In some embodiments, the operational condition is a temperature, a voltage, and/or a current.

The comparing circuit 730 is configured to compare the received reference signal to the output of the sensing circuit 725. If, for example, a sensed current is greater than a reference current or current limit value that corresponds to the received reference signal, the comparing circuit 730 outputs a signal to the driver circuit 720 for controlling the first semiconductor switch 735 and/or the second semiconductor switch 740. In some embodiments, the output signal from the comparing circuit 730 causes the driver circuit 720 to open the first semiconductor switch 735 and/or the second semiconductor switch 740. In other embodiments, the output signal from the comparing circuit 730 causes the driver circuit 720 to close the first semiconductor switch 735 and/or the second semiconductor switch 740. As a result, the output signal from the comparing circuit 730 is operable or configured to trip or reset the resettable electronic fuse 230, 445, 630. In some embodiments, the driver circuit 720 also includes a timer or counter for resetting the resettable electronic fuse 230, 445, 630 after an amount of time has elapsed (e.g., sufficient time for an overcurrent condition to have ended). In other embodiments, the driver circuit 720 (or controller 200, 400, 600) is configured to average a predetermined number of past sensed values (e.g., sensed current) to determine when a running average of the sensed values over the predetermined number of sensed values (e.g., 2, 3, 5, 10, or more sensed values) or predetermined time period (e.g., less than one second, greater than one second, less than two seconds, etc.) is less than the reference signal (e.g., to introduce hysteresis).

The resettable electronic fuse 230, 445, 630 illustrated in FIG. 7 also includes a fourth input/output pin 745 connected to the driver circuit 720. The fourth input/output pin 745 is connected, for example, to the controller 200, 400, 600 such that the controller 200, 400, 600 can provide a signal to the driver circuit 720 that causes the driver circuit 720 to control the first semiconductor switch 735 and/or the second semiconductor switch 740. In some embodiments, the fourth input/output pin 745 is used to control the resettable electronic fuse 230, 445, 630 based on a condition different from or redundant to a condition that the resettable electronic fuse 230, 445, 630 is configured to monitor. For example, the resettable electronic fuse 230, 445, 630 can be configured to monitor electric current. The battery pack 100, the device 300, or the battery pack charger 500 in which the resettable electronic fuse 230, 445, 630 is implemented is configured to further sense or monitor other parameters or conditions of the battery pack 100, the device 300, or the battery pack charger 500 (e.g., e.g., over-temperature, under-temperature, overvoltage, undervoltage, etc.). In some embodiment, the controller 200, 400, 600 is configured to monitor a temperature of one or more semiconductor switches (e.g., the first semiconductor switch 735 and/or the second semiconductor switch 740) or integrated circuits (e.g., the resettable electronic fuse 230, 445, 630). If, after comparing the sensed parameter or condition to a reference value, a fault condition of the battery pack 100, the device 300, or the battery pack charger 500 is detected by the controller 200, 400, 600, respectively, the controller 200, 400, 600 is configured to provide a signal to the fourth input/output pin 745 to correspondingly control the resettable electronic fuse 230, 445, 630. If the resettable electronic fuse 230, 445, 630 is used to monitor current, one of the semiconductor switches 735, 740 is used to monitor current, the temperature of the device, the resettable electronic fuse 230, 445, 630, the semiconductor switch 735, 740, etc., can be used to adjust either the monitored current signal or the current threshold for comparison (e.g., to avoid an erroneous trip).

The control action taken by the resettable electronic fuse 230, 445, 630 based on the signal received at the fourth input/output pin 745 can be to open the first semiconductor switch 735 and/or the second semiconductor switch 740 or to close the first semiconductor switch 735 and/or the second semiconductor switch 740. As a result, the signal received at the fourth input/output pin 745 is operable or configured to trip or reset the resettable electronic fuse 230, 445, 630. For example, the controller 200, 400, 600 is configured to cause the resettable electronic fuse 230, 445, 630 to be tripped when a fault condition is detected. The controller 200, 400, 600 is then configured to cause the resettable electronic fuse 230, 445, 630 to be reset when the fault condition has ended (e.g., based on one or more sensed signals, a timer or counter, etc.). In some embodiments, the signal received at the fourth input/output pin 745 is used to control a slew rate (e.g., an electrical current slew rate) by controlling gate voltages of the first semiconductor switch 735 and/or the second semiconductor switch 740 to limit the rate at which an electrical current passing through the resettable electronic fuse 230, 445, 630 changes. In some embodiments, the resettable electronic fuse 230, 445, 630 is used to control a current or voltage in place of a power or control switch. For example, the resettable electronic fuse 230, 245, 630 can be used to control a pulse-width modulation ("PWM") signal to control an amount of current provided to the device 300, an amount of current received from the battery pack charger 500, etc.

Figure 8:
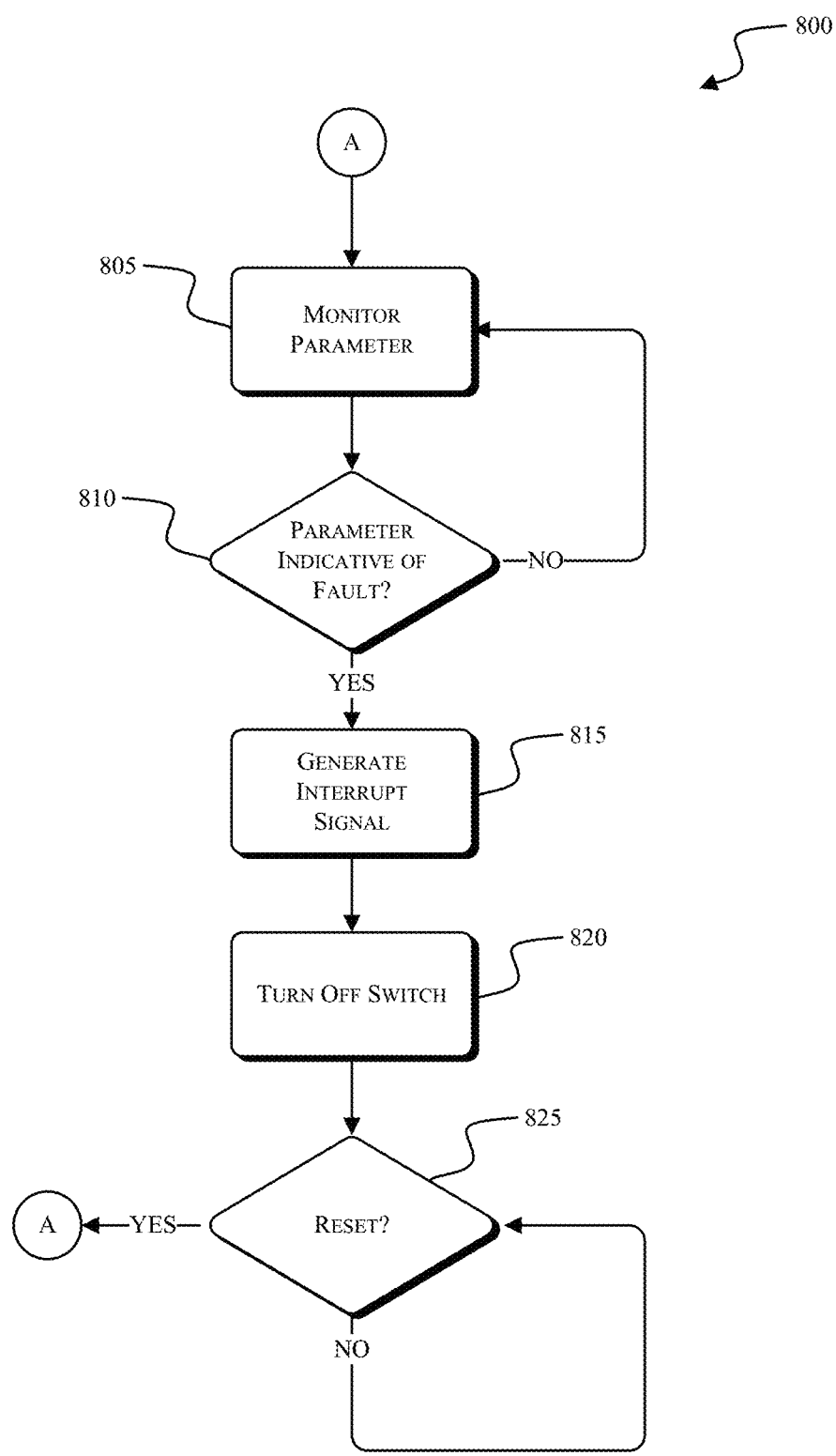
FIG. 8 is a process for operating a resettable electronic fuse, according to embodiments described herein.

FIG. 8 is a process 800 for operating a resettable electronic fuse, such as the resettable electronic fuse 230, 445, 630. The process 800 begins with monitoring a parameter of a device (STEP 805). The device is, for example, the battery pack 100, the device 300, or the battery pack charger 500. The monitoring of the parameter can be performed by the resettable electronic fuse 230, 445, 630 (e.g., current monitoring, etc.) and/or by the controller 200, 400, 600 (e.g., temperature monitoring, voltage monitoring, etc.). If, at STEP 810, the monitored parameter is not indicative of a fault condition of the device, the process 800 continues to monitor the parameter at STEP 805. If, at STEP 810, the monitored parameter has a value that is indicative of a fault condition of the device, the process 800 proceeds to STEP 815 where an interrupt signal is generated. The interrupt signal can be generated within the resettable electronic fuse 230, 445, 630 (e.g., by comparing circuit 730) or can be generated externally to the resettable electronic fuse 230, 445, 630 (e.g., by controller 200, 400, 600).

After the interrupt signal is generated at STEP 815, the interrupt signal is received, for example, by the driver circuit 720 and the driver circuit 720 causes the first semiconductor switch 735 and/or the second semiconductor switch 740 to be turned OFF or opened (STEP 820). In some embodiments, the first semiconductor switch 735 and/or the second semiconductor switch 740 are turned OFF to prevent current from passing through the resettable electronic fuse 230, 445, 630. In other embodiments, the first semiconductor switch 735 and/or the second semiconductor switch 740 are turned OFF and back ON again to limit or control the current passing through the resettable electronic fuse 230, 445, 630.

After the driver circuit 720 has caused the first semiconductor switch 735 and/or the second semiconductor switch 740 to be turned OFF or opened at STEP 820, the resettable electronic fuse waits to be reset (STEP 825). The resettable electronic fuse 230, 445, 630 can generate a reset signal itself (e.g., as an output of the comparing circuit 730, based on a timer in the driver circuit 720, etc.), and/or the resettable electronic fuse 230, 445, 630 can receive a reset single from another component (e.g., controller 200, 400, 600). When a reset signal is received by the driver circuit 720, the resettable electronic fuse 230, 445, 630 is reset by causing the first semiconductor switch 735 and/or the second semiconductor switch 740 to be turned ON or closed. The process 800 then returns to STEP 805 where the parameter of the device is again monitored. In some embodiments, the monitoring of the parameter of the device at STEP 805 is a continuous monitoring of the parameter of the device. For example, the monitoring of the parameter of the device continues after the first semiconductor switch 735 and/or the second semiconductor switch 740 to be turned OFF or opened at STEP 820. By continuing to monitor the parameter of the device, the resettable electronic fuse 230, 445, 630 or another component (e.g., controller 200, 400, 600) is able to determine when a fault condition has ended and is no longer present. Detecting that the fault condition has ended or is no longer present can then cause the reset signal for the resettable electronic fuse to be generated.

Thus, embodiments described herein provide a resettable electronic fuse for a device (e.g., a high-power device), such as a power tool, a battery pack for the power tool, or a battery pack charger. Various features and advantages are set forth in the following claims.

What is claimed is:

1. A battery pack including a path for passing electric current, the battery pack comprising:
a plurality of battery cells;
a terminal electrically connected to the plurality of battery cells; and
a resettable electronic fuse configured as a single component in the path for passing electric current and electrically connected to the terminal, the resettable electronic fuse including a housing, the resettable electronic fuse including, within the housing:
a semiconductor switch including a conductive state and a nonconductive state,
a driver circuit configured to control the semiconductor switch into either the conductive state or the nonconductive state,
a sensing circuit configured to sense a parameter of the battery pack, and
a comparing circuit configured to compare the parameter of the battery pack to a first reference value for the parameter,
wherein the driver circuit is configured to control the semiconductor switch into the nonconductive state when the parameter of the battery pack is greater than or equal to the first reference value for the parameter.

2. The battery pack of claim 1, further comprising:
a controller including a non-transitory computer readable medium and a processor, the controller comprising computer executable instructions stored in the computer readable medium for controlling operation of the battery pack to:
sense a second parameter of the battery pack, the second parameter of the battery pack being different than the first parameter of the battery pack,
compare the second parameter of the battery pack to a second reference value for the second parameter, and
generate an output signal for the driver circuit to control the semiconductor switch into the nonconductive state when the second parameter of the battery pack is greater than or equal to the second reference value for the second parameter.

3. The battery pack of claim 2, wherein:
the first parameter of the battery pack is an electric current; and
the second parameter of the battery pack is a temperature.

4. The battery pack of claim 2, wherein:
the first parameter of the battery pack is an electric current; and
the second parameter of the battery pack is a voltage associated with the plurality of battery cells.

5. The battery pack of claim 1, wherein the driver circuit is further configured to control the semiconductor switch into the conductive state when the parameter of the battery pack is less than the first reference value for the parameter.

6. The battery pack of claim 1, wherein the resettable electronic fuse further includes a second semiconductor switch including a conductive state and a nonconductive state.

7. The battery pack of claim 1, further comprising:
a second terminal; and
a second resettable electronic fuse configured as a single component and electrically connected to the second terminal, the second resettable electronic fuse including a second housing, the second resettable electronic fuse including, within the second housing:

a second semiconductor switch including a conductive state and a nonconductive state,
a second driver circuit configured to control the second semiconductor switch into either the conductive state or the nonconductive state,
a second sensing circuit configured to sense a second parameter of the battery pack, and
a second comparing circuit configured to compare the second parameter of the battery pack to a second reference value for the second parameter,
wherein the second driver circuit is configured to control the second semiconductor switch into the nonconductive state when the second parameter of the battery pack is greater than or equal to the second reference value for the second parameter.

8. A power tool including a path for passing electric current, the power tool comprising:
a power tool housing;
a brushless motor within the power tool housing;
a terminal electrically connected to the brushless motor; and
a resettable electronic fuse configured as a single component and electrically connected to the terminal, the resettable electronic fuse including a housing, the resettable electronic fuse including, within the housing:
a semiconductor switch including a conductive state and a nonconductive state,
a driver circuit configured to control the semiconductor switch into either the conductive state or the nonconductive state,
a sensing circuit configured to sense a parameter of the power tool, and
a comparing circuit configured to compare the parameter of the power tool to a reference value for the parameter,
wherein the driver circuit is configured to control the semiconductor switch into the nonconductive state when the parameter of the power tool is greater than or equal to the reference value for the parameter.

9. The power tool of claim 8, further comprising:
a controller including a non-transitory computer readable medium and a processor, the controller comprising computer executable instructions stored in the computer readable medium for controlling operation of the power tool to:
sense a second parameter of the power tool, the second parameter of the power tool being different than the parameter of the power tool,
compare the second parameter of the power tool to a second reference value for the second parameter, and
generate an output signal for the driver circuit to control the semiconductor switch into the nonconductive state when the second parameter of the power tool is greater than or equal to the second reference value for the second parameter.

10. The power tool of claim 9, wherein:
the parameter of the power tool is an electric current; and
the second parameter of the power tool is a temperature.

11. The power tool of claim 9, wherein the driver circuit is further configured to control the semiconductor switch into the conductive state when the parameter of the power tool is less than the reference value for the parameter.

12. The power tool of claim 9, wherein the resettable electronic fuse further includes a second semiconductor switch including a conductive state and a nonconductive state.

13. The power tool of claim 9, further comprising:
a second terminal; and
a second resettable electronic fuse configured as a single component and electrically connected to the second terminal, the second resettable electronic fuse including a second housing, the second resettable electronic fuse including, within the second housing:
a second semiconductor switch including a conductive state and a nonconductive state,
a second driver circuit configured to control the second semiconductor switch into either the conductive state or the nonconductive state,
a second sensing circuit configured to sense a second parameter of the power tool, and
a second comparing circuit configured to compare the second parameter of the power tool to a second reference value for the second parameter,
wherein the second driver circuit is configured to control the second semiconductor switch into the nonconductive state when the second parameter of the power tool is greater than or equal to the second reference value for the second parameter.

14. A battery pack charger including a path for passing electric current from a power source, the battery pack charger comprising:
a battery pack charger housing;
a battery pack interface configured to receive a battery pack to be charged;
a terminal connected to the power source in the path for passing electric current; and
a resettable electronic fuse configured as a single component in the path for passing electric current and electrically connected to the terminal, the resettable electronic fuse including, within a housing:
a semiconductor switch including a conductive state and a nonconductive state,
a driver circuit configured to control the semiconductor switch into either the conductive state or the nonconductive state,
a sensing circuit configured to sense a parameter of the battery pack charger, and
a comparing circuit configured to compare the parameter of the battery pack charger to a reference value for the parameter,
wherein the driver circuit is configured to control the semiconductor switch into the nonconductive state when the parameter of the battery pack charger is greater than or equal to the reference value for the parameter.

15. The battery pack charger of claim 14, further comprising:
a controller including a non-transitory computer readable medium and a processor, the controller comprising computer executable instructions stored in the computer readable medium for controlling operation of the processor to:
sense a second parameter of the battery pack charger,
compare the second parameter of the battery pack charger to a second reference value for the second parameter, and
generate an output signal for the driver circuit to control the semiconductor switch into the nonconductive state when the second parameter of the battery pack charger is greater than or equal to the second reference value for the second parameter.

16. The battery pack charger of claim 15, wherein:
the parameter of the battery pack charger is an electric current; and
the second parameter of the battery pack charger is a temperature.

17. The battery pack charger of claim 14, wherein the driver circuit is further configured to control the semiconductor switch into the conductive state when a running average of values for the parameter of the battery pack charger over a predetermined number of values is less than the first reference value.

18. The battery pack charger of claim 14, wherein the driver circuit is further configured to control the semiconductor switch into the conductive state when the parameter of the battery pack charger is less than the first reference value.

19. The battery pack charger of claim 14, wherein:
the semiconductor switch includes a first semiconductor switch including a conductive state and a nonconductive state and connected in series with a second semiconductor switch including a conductive state and a nonconductive state; and
the driver circuit is configured to control at least one of the first semiconductor switch and the second semiconductor switch into the nonconductive state when the parameter of the battery pack charger is greater than or equal to the reference value.

20. The battery pack charger of claim 14, wherein the parameter of the battery pack charger must be greater than or equal to the first reference value for at least a defined period of time before the semiconductor switch is controlled into the nonconductive state.

* * * * *